United States Patent [19]

Nelson

[11] Patent Number: 5,768,612

[45] Date of Patent: Jun. 16, 1998

[54] INTERFACE ALLOWING USE OF A NON-PCI STANDARD RESOURCE ON A PCI STANDARD BUS

[75] Inventor: Albert R. Nelson, Hillsboro, Oreg.

[73] Assignee: Intel Corporation, Santa Clara, Calif.

[21] Appl. No.: 869,648

[22] Filed: Jun. 5, 1997

Related U.S. Application Data

[63] Continuation of Ser. No. 603,692, Feb. 20, 1996, abandoned, which is a continuation of Ser. No. 255,365, Jun. 8, 1994, abandoned.

[51] Int. Cl.[6] .................................................. G06F 13/00
[52] U.S. Cl. .............. 395/800.32; 395/309; 395/800.33; 395/800.36; 395/800.39; 364/DIG. 1
[58] Field of Search .................... 395/800.32, 800.33, 395/800.36, 800.39, 306, 307, 309; 364/DIG. 1

[56] References Cited

U.S. PATENT DOCUMENTS

| | | | |
|---|---|---|---|
| 4,038,642 | 7/1977 | Bouknecht et al. | 364/900 |
| 4,663,704 | 5/1987 | Jones et al. | 364/188 |
| 4,783,730 | 11/1988 | Fischer | 364/200 |
| 5,099,473 | 3/1992 | Guta et al. | 370/56 |
| 5,390,324 | 2/1995 | Burckhartt | 395/575 |
| 5,392,407 | 2/1995 | Heil et al. | 395/325 |
| 5,396,602 | 3/1995 | Amini et al. | 395/325 |
| 5,426,739 | 6/1995 | Lin et al. | 395/309 |
| 5,440,755 | 8/1995 | Harwer et al. | 395/800 |
| 5,450,551 | 9/1995 | Amini et al. | 395/299 |
| 5,502,824 | 3/1996 | Heil | 395/293 |
| 5,522,050 | 5/1996 | Amini et al. | 395/306 |

Primary Examiner—Alyssa H. Bowler
Assistant Examiner—Dzung C. Nguyen
Attorney, Agent, or Firm—Blakely, Sokoloff, Taylor & Zafman

[57] ABSTRACT

An interconnect mechanism for allowing use of an IDE compatible add-in card in a PCI compliant expansion slot. Unused PCI pins are exploited to provide for proper routing of necessary interrupt signals from an IDE add-in card. The presence of the IDE card in the PCI slot enables signaling circuitry for routing IDE interrupts to the computer system's interrupt controller and reroutes existing hard disk interrupt signals to the interrupt controller as a secondary hard disk interrupt. Another otherwise unused pin is exploited to provide a signal for lighting the computer system's hard disk active indicating LED. The gating circuitry is provided such that non-IDE, PCI-compliant add-in cards are provided with unaffected operation in the PCI slot.

17 Claims, 3 Drawing Sheets

INTERFACE ALLOWING USE OF A NON-PCI STANDARD RESOURCE ON A PCI STANDARD BUS

This is a continuation of application Ser. No. 08/603,692 filed Feb. 20, 1996, now abandoned, which is a continuation of application Ser. No. 08/255,365, filed Jun. 8, 1994 now abandoned.

BACKGROUND OF THE INVENTION

1. Field of the Invention

The present invention relates to computer system peripheral connections. More particularly, the present invention relates to interconnecting peripheral devices with the emerging PCI local bus standard.

2. Art Background

In the computer industry, one widely accepted system architecture for stand alone systems has been the AT system design. Computer system mother boards supporting this system type generally include a standardized input/output (I/O) bus for providing inter-system communications between the various system components. For example, the system's central processing unit (CPU) will utilize this bus for retrieving and writing data to the system's hard disk drive or other storage devices. Such system bus standards include the well-known ISA and EISA standards to which, for example, a hard disk drive may be connected through an Integrated Drive Electronics (IDE) interface.

As computer processor technology has developed, the traditional ISA, EISA and other I/O bus standards have proven inadequate to serve computer systems with advanced processors. There has recently been introduced a new I/O bus standard for use as a primary I/O bus which provides a much greater bandwidth than previously existing bus standards. The Peripheral Component Interconnect (PCI) bus is quickly receiving wide acceptance in the computer industry. The PCI bus standard provides for a high bandwidth and a flexibility that is independent of new processor technologies and increased processor speed. At this time, computer system architects are primarily designing speed sensitive peripherals such as graphics accelerators and SCSI disk drive controllers to be utilized with the PCI bus.

Computer systems designed today that incorporate PCI bus capabilities generally also include a slower, secondary I/O bus such as the ones described above, for compatibility with numerous existing, previously designed peripheral devices. There are a number of differences between the PCI bus standard and the previous I/O bus standards, particularly with respect to the various interrupt protocols. For example, the EISA/ISA bus architectures provides for 16 interrupt signals, IRQ[0:15] with each designated for different possible uses. The PCI bus on the other hand provides for four shared interrupts, INTR[A:D], with each shared by all slots on the PCI bus.

Many hard disk drives designed for use in computer systems today utilize an Integrated Drive Electronics (IDE) standard interface. The IDE interface has proven very cost effective and has grown to wide acceptance in the PC motherboard industry. The IDE specification has been adapted to provide faster capabilities for IDE drives used on faster "local bus" strategies. However, to interface a simple IDE drive to the PCI bus is considerably difficult and expensive. Complications arise because there is a long standing PC AT compatibility requirement to share a computer system register between the IDE drive and floppy drive interfaces. The sharing of a register requires that both devices drive the data bus during an access to that register. Of course, each device drives different bits of data. More specifically, an I/O read of address 3f7h results in the IDE device driving bits [0:6] and the floppy device driving bit [7]. This is easily accomplished when both devices reside on the same ISA or EISA bus by using bi-directional tristable buffers. To support a floppy drive on the PCI bus as well as an IDE interface would be a cost prohibitive solution to satisfy the requirement because of special "bus mastering" devices that must be utilized to replace the normal floppy drive DMA transfers. In any event, this would be inefficient because the floppy drive is so slow that a PCI implementation would introduce a bottleneck to system PCI performance.

Another problem with implementing IDE compatible hard disk drives on the PCI bus is that the PCI bus does not provide certain required signals to support an IDE interface. These signals include the designated hard disk interrupt output and an output to activate the computer system's hard disk drive active LED indicator. Further, the PCI specification identifies no spare pins for use by non-compliant devices. It would be advantageous, and is therefore an object of the present invention, to provide a fully compliant PCI slot on a computer system motherboard which can also provide an interface to an IDE disk drive for use on a PCI bus.

SUMMARY OF THE PRESENT INVENTION

From the foregoing it can be appreciated that a computer system's performance may be enhanced by providing a mechanism to allow a hard disk drive with an IDE interface to be used on the computer system's enhanced I/O bus. Accordingly, it is an object of the present invention to provide a method and apparatus for utilizing an IDE-interfaced hard disk drive in a computer system through a novel interconnect to a high speed local bus such as the PCI bus. These and other objects of the present invention are provided by including additional circuitry on the computer system's motherboard for utilizing an IDE compatible disk drive through one of the computer system's PCI slots. The PCI slots on the system's board are unaltered and remain fully PCI compatible for use by other PCI expansion cards. Several pins that are not used by the PCI protocol during normal system operation are exploited by the present invention.

An IDE add-in card with a PCI connector will signal its presence in the PCI slot to the modified system motherboard by providing a presence signal over an otherwise unused test input pin designated in the PCI protocol. The computer system's motherboard will include a weak pull-up resistor to default the signal to an inactive indication when no IDE card is present. An IDE card will provide an active low signal on the pin when inserted. When an IDE card is detected in the PCI slot, signal steering circuitry will be activated to allow for the proper interrupt and other signals to be detected and utilized from the card.

The affected PCI slot on the modified system motherboard will be coupled to receive the DSKCHG-signal from the system's floppy disk drive interface through a PCI-reserved pin when an IDE card presence signal enables a control gate. The IDE card interrupt output will be provided through another enabled gate circuit to provide a proper primary hard disk drive interrupt signal to the system's interrupt controller. The routing of IDE interrupts is through an otherwise reserved and unused pin in the PCI protocol. Similarly, if the computer system has a hard disk drive present on a secondary I/O bus, its interrupt signal will be steered to the interrupt controller as a secondary hard disk drive interrupt. Finally, another PCI-reserved pin is used for signaling an activation signal to the hard disk drive active indicating LED when the IDE card is active in the PCI slot.

BRIEF DESCRIPTION OF THE DRAWINGS

The objects, features and advantages of the present invention will be apparent from the following detailed description in which.

DETAILED DESCRIPTION OF THE PRESENT INVENTION

A method and apparatus are provided for operating a peripheral add-in card in a computer system with PCI-compliant expansion slots where the peripheral add-in card requires certain control signals not available under the PCI protocol. In this detailed description, one embodiment of a computer system which includes a PCI bus and PCI-compliant expansion slots is described. The system also includes a secondary I/O bus described with reference to the ISA or EISA bus standards. It should be understood that this is for the purpose of illustration and is not provided as a limitation in that the present invention may be practiced on other computer systems where it is desirable to utilize an add-in card not accommodated by a given bus standard.

Throughout this detailed description, numerous specific details are set forth such as particular signal names, bus protocols and resistor values, in order to provide a thorough understanding of the present invention. It will be appreciated by one having ordinary skill in the art that the present invention may be practiced without such specific details. In other instances, well-known components, structures and techniques have not been described in detail in order to avoid obscuring the subject matter of the present invention. In addition, signal names identified in this detailed description are not intended to convey the active state of a given signal (active high or active low) but are simply used to name interface signals for discussion.

Figure 1:
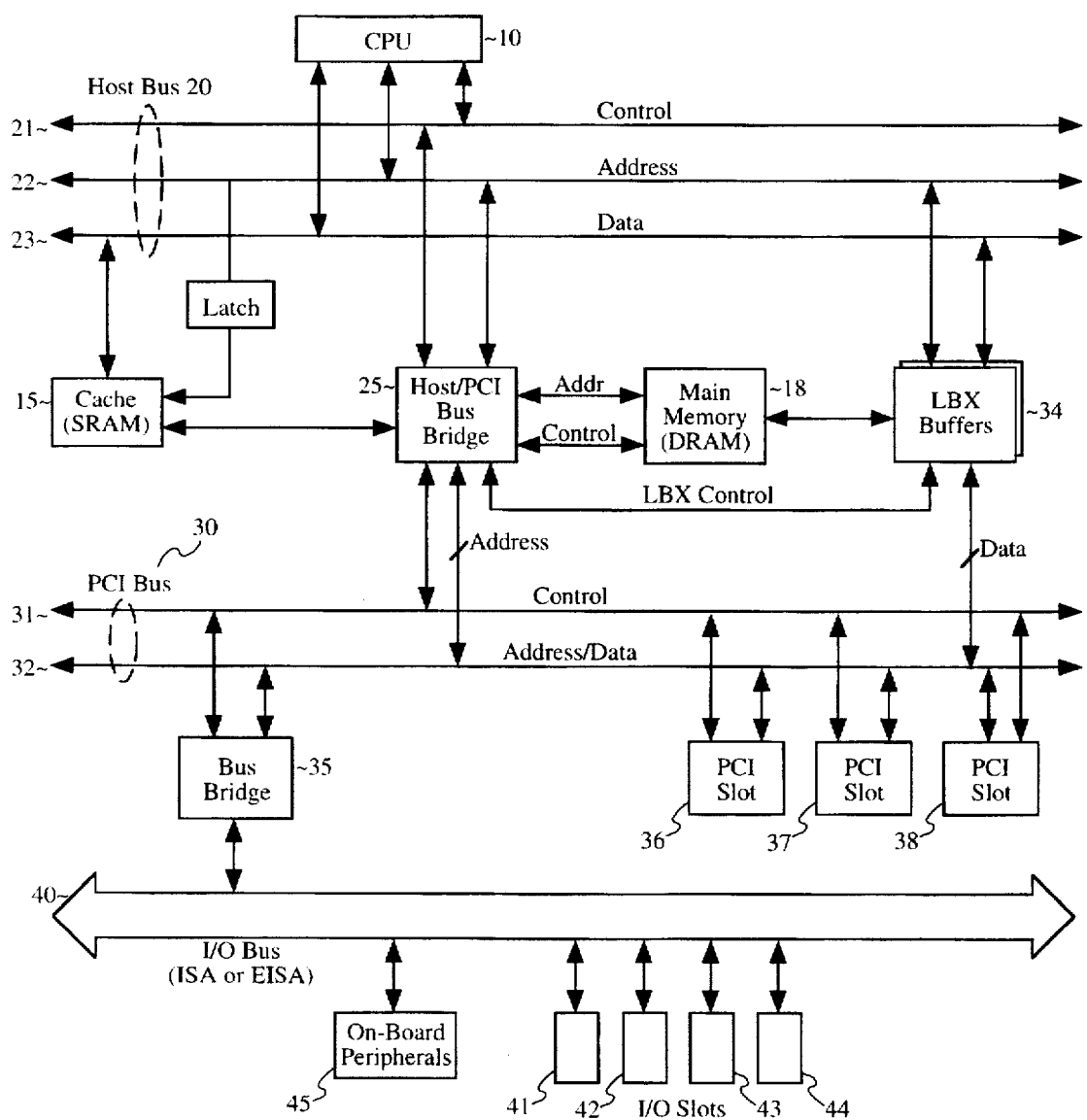
FIG. 1 illustrates a block diagram of a computer system architecture using a hierarchy of buses incorporating one embodiment of the present invention.

Referring now to FIG. 1, a computer system architecture which may incorporate the present invention is illustrated. The computer system architecture of FIG. 1 is illustrated so as to highlight the hierarchical bus organization of the architecture. It can be seen that the computer system's central processing unit (CPU) 10 communicates with its SRAM cache 15 over a Host bus 20. In one embodiment, the Host bus 20 includes control lines 21, address lines 22 and data lines 23. In other embodiments, the address and data lines may be multiplexed to share common signal paths. A Host bus is usually designed to meet the needs of high performance computing associated with whatever type of processor is implemented for CPU 10.

In some computer system architectures, the computer system's main memory will be directly coupled to the processor Host bus. In the illustrated implementation, the DRAM main memory 18 is coupled to the Host bus through the Host/PCI bus bridge 25. The Host/PCI bus bridge 25 is used as a bridge between the Host bus 20 and the system's PCI bus 30. The PCI bus, as described above, serves as the primary I/O bus and was designed to address the growing industry needs for a standardized local bus that is not directly dependent on the speed and size of a computer system's processor bus. The PCI bus 30 as illustrated in FIG. 1 is shown separated into control lines 31 and address/data lines 32. The Host/PCI bus bridge 25 monitors the Host bus 20 and the PCI bus lines 31 and 32 and determines whether a transaction is designated for the computer system's main memory system 18 or whether a CPU request should be propagated down the hierarchy of buses, the next step being down to the PCI bus 30.

There is shown coupled to the PCI bus 30 in FIG. 1 three PCI slots 36, 37 and 38 for receiving peripheral device designed to be compliant with the PCI bus standard. Such add-in cards may include graphics accelerators, disk drive controllers, and other speed sensitive peripherals which may take advantage of the abilities of the PCI local bus 30. There is also shown coupled between the address/data lines 32 of the PCI bus and the Host bus a collection of buffers, denoted LBX buffers 34 which are used to buffer data transfers between the two buses 20 and 30. The buffers 34 are implemented to compensate for the varying speeds that the two buses may be operating at and enhance system performance by allowing for concurrency between the Host bus 20 and PC bus, giving each greater bus throughput and decreased latency.

There is finally shown in FIG. 1, a secondary I/O bus 40 which in alternative embodiments may be a peripheral I/O bus compliant with the ISA or EISA standards, or other peripheral bus standards. Coupled to the I/O bus 40 are four I/O slots 41, 42, 43 and 44 which may be used for receiving various peripherals. On-board peripherals 45 such as floppy disk drives, hard disk drives equipped with an IDE standard interconnect, and other peripherals normally associated with computer systems are often designed right on the system's motherboard and do not require an I/O slot which are provided for other add-in card upgrades. The on-board peripherals 45 do electrically reside and the secondary I/O bus 40. In general, the I/O bus 40 is a slower bus than the PCI bus 30 but is still included in newer computer systems to maintain compatibility with previously designed peripherals.

Having both an ISA bus and a PCI bus allows personal computer platforms built around the PCI bus as a primary I/O bus to leverage the large ISA product base. The ISA bus provides 24-bit addressing and a 16-bit datapath. An EISA I/O bus allows a personal computer platform built around the PCI bus as a primary I/O bus to leverage the large EISA/ISA product base. Along with compatibility for 16-bit and 8-bit ISA hardware and software, the EISA bus provides for 32-bit addressing and a 32-bit datapath. Of course, other secondary I/O buses may provide similar features.

Coupled between the PCI bus 30 and the secondary I/O bus 40 of the computer architecture of FIG. 1 is illustrated a bus bridge 35. The bus bridge 35 may incorporate the logic for interfacing the secondary I/O bus 40 with the PCI bus 30 as well as incorporating support for any necessary DMA controllers and interrupt control logic. For example, if a traditional hard disk drive having an IDE interconnect is present in I/O slot 41 and that IDE drive requests a transaction with the CPU, the IDE drive will signal an interrupt, IRQ 14, which will be recognized as a primary hard disk drive access by the system. When the computer system recognizes an IRQ 14 interrupt, it will vector to the necessary code for accessing the hard disk drive. When the IDE hard disk drive is active, it will also output a signal, HDACTIVE, which is used to illuminate an LED which indicates to the system user that the hard disk drive is active. Finally, as was described above, when an IDE disk drive is active on the I/O bus 40, a shared portion of the transaction is carried out by the floppy disk drive controller which may be in one of the other I/O slots or separately connected to the I/O bus. The floppy disk drive interface provides the DSKCHG signal required for the transaction.

It can be seen from the above that to effectively utilize a hard disk drive having an IDE interconnect, it is necessary that the IDE add-in card be able to provide an interrupt signal to IRQ 14, receive the DSKCHG signal from a floppy drive, and preferably also to be able to provide the HDACTIVE signal to illuminate the hard disk active indicating LED.

Figure 2:
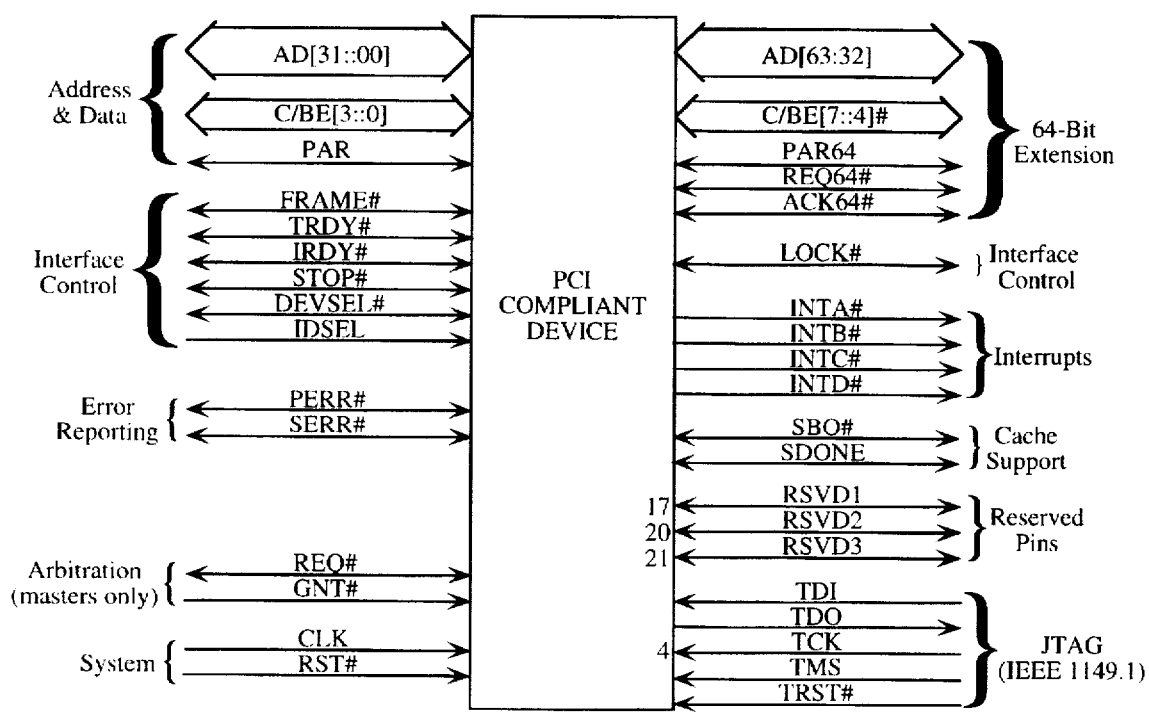
FIG. 2 illustrates some pin designations for a PCI compatible interconnect.

The emerging PCI local bus standard provides for a different I/O interrupt mechanism than the secondary I/O buses utilize, thus allowing a computer system to continue to exploit the existing product base for ISA and EISA designed peripherals. Referring now to FIG. 2, a signal designation diagram is shown for a PCI compliant device. Numbers indicated within the device along side a particular signal line represent pin-out designations for one embodiment implementing a PCI interface. In addition to providing address and data signal lines, it can be seen that the PCI interface provides for four interrupts, INTA#, INTB#, INTC#, and INTD#. Each PCI slot on a system motherboard designed around the PCI bus should include these interrupt lines. It can be seen that there is no special designation for such a signal as the IRQ 14 interrupt signal required by an IDE add-in card. Similarly, it can be seen that no provision is made for inputting the DSKCHG signal from a floppy drive to an IDE card in a PCI slot nor is there an HDACTIVE output pin designation. Thus, the PCI specification in and of itself does not provide for implementing an IDE add-in card on a PCI compliant expansion slot.

An important aspect of the present invention is to provide a mechanism for utilizing an IDE compliant add-in card in a computer system's PCI slot where the PCI slot is fully PCI-compliant and will work normally with any other PCI add-in card. This is effected by recognizing that during normal computer system operation, certain pins in the PCI specification are not utilized. FIG. 2 shows that the PCI standard designates a series of test pins, preferably compliant with the JTAG test platform (IEEE specification 1149.1). During normal system operation, the test pins should not be utilized and under the PCI specification are to be left inactive. One of these pins is designated the TCK signal which is shown ordinarily as a clock input to the PCI compliant device during test operations. The PCI specification does not provide for any unused pins, but as can be seen from the illustration of FIG. 2, a number of pins in some implementations have been designated as reserved. These include the RSVD1 pin indicated at pin-out 17, RSVD2 pin at pin-out 20 and the RSVD3 pin at pin-out 21. Others may be included that are not illustrated.

It is possible to design a computer system having fully PCI-compliant PCI expansion slots, while also taking advantage of the several otherwise unutilized pins to implement an IDE add-in card in one of the PCI slots. If done properly, the affected PCI slot will still operate normally with any PCI-compliant add-in card, and will also provide support for utilizing a suitably configured IDE add-in card on the PCI bus. The IDE card will still have to be designed with the PCI address/data transfer protocols observed.

Figure 3:
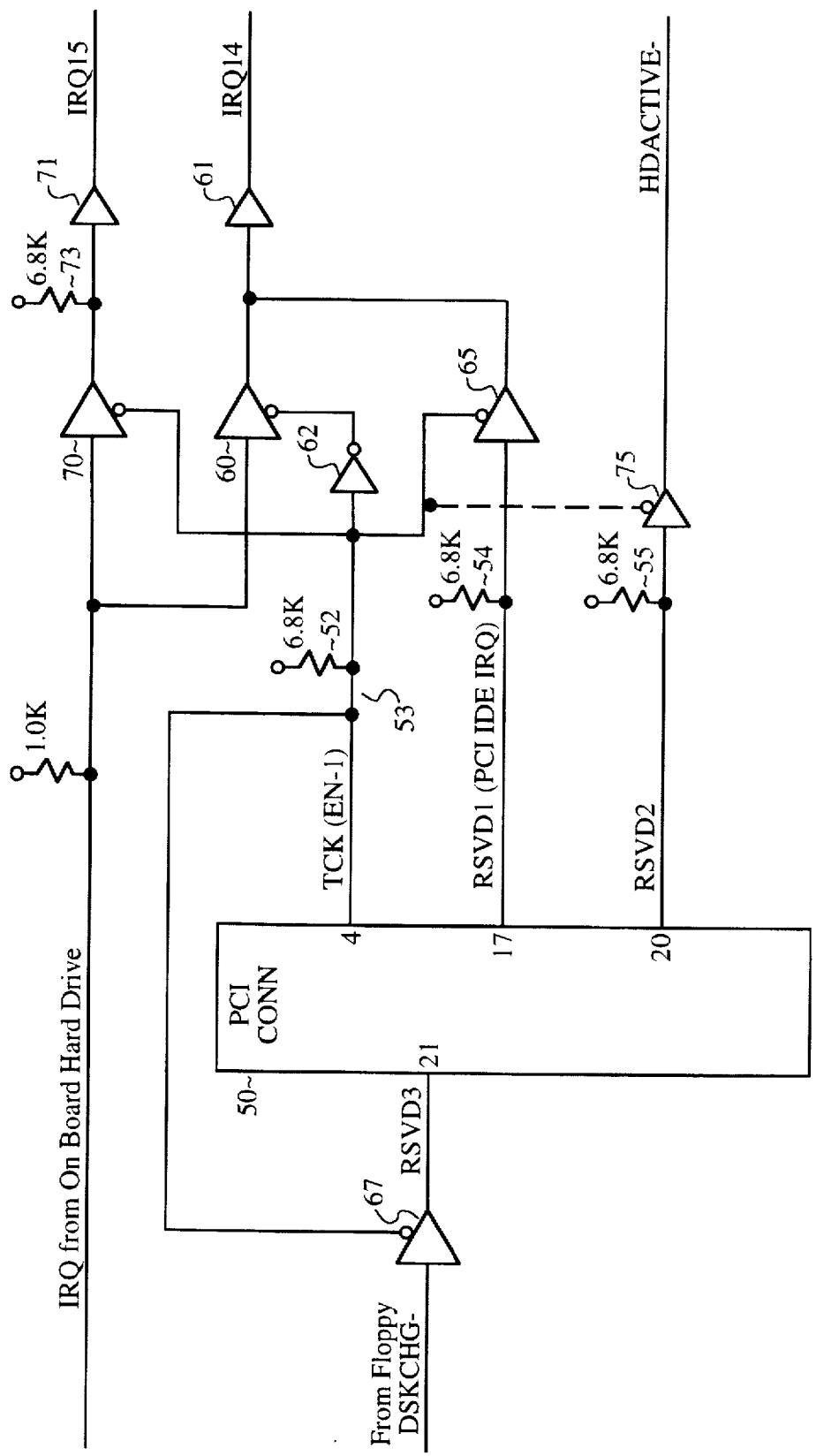
FIG. 3 is a gate level circuit diagram of the PCI-to-IDE interconnect circuitry implemented in one embodiment of the present invention.

Referring now to FIG. 3, a gate level circuit diagram is illustrated for a circuitry that allows a computer system motherboard to operate with an IDE add-in card present in a PCI connector slot. There is shown in FIG. 3 one PCI connector 50 for receiving either a PCI compliant device, or an IDE add-in card equipped with a pin compatible PCI connector. The pin compatible connector will, for example, route the IDE address and data output signals through the PCI specified address and data lines. The IDE-ready connector will also take advantage of the pins described above which are not normally utilized by a PCI device.

The recognition of an IDE device in a PCI slot will be performed by the computer system based on the circuitry shown on the motherboard. The IDE add-in card will indicate its presence by activating a signal through output pin 4 which as described above, is normally an input for the TCK clock signal in the PCI specification. Alternatively, this signal may also be connected to an I/O port that the CPU may read to determine if a suitably configured IDE add-in card is present. The system motherboard will be equipped with a pull-up resistor 52 so that when no IDE card is present, an inactive TTL-high signal will be visible at the node 53. In the illustrated embodiment, a small resistance value of 6.8K ohms is suggested to serve as a very weak pull-up which can easily be overcome should other devices utilize this pin. The IDE interconnect will also exploit three of the reserved pins described above, RSVD1 output through pin 17, RSVD2 output through pin 20 and RSVD3 as an input through pin 21. Pull-up resistors 54 and 55 will also be implemented on the system motherboard to maintain PCI compliance when no IDE device is present in the PCI connector 50.

When no IDE device is present in the PCI connector, an on-board hard disk drive present on the secondary I/O bus will output its interrupt signal as IRQ 14 which is recognized as the primary hard disk drive interrupt by the computer system's BIOS. The interrupt will be propagated through gate 60 and open collector 61 so that normal hard disk drive interrupts, IRQ 14, are visible. When an IDE add-in card is provided in the PCI connector 50, it will drive its interrupt output through pin 17. The presence of the IDE add-in card in the PCI connector 50 will also send an active low presence signal through output pin 4 which will propagate through the inverter 62 to the enable input of gate 60. This prevents the on-board hard disk drive IRQ 14 from being passed through that gate. Interrupts output from the IDE card through pin 17 will be propagated through gate 65 which receives the enable signal due to the presence signal propagated through pin 4. The IDE interrupts will then be routed through the open collector 61 and out as the IRQ 14 hard disk drive interrupt. Similarly, when an IDE add-in card is present in the PCI connector, the presence signal will activate gate 67 for receiving the DSKCHG signal through RSVD3 pin 21, this signal being needed for the reasons described above.

It is possible that the computer system may include a hard disk drive on the system's secondary I/O bus 40 when an IDE add-in card is added to PCI connector 50. In this case, it is necessary to handle interrupts that may be generated by that hard disk drive. When the presence signal is active from the PCI connector 50, an enable signal is provided to gate 70 which routes the second hard disk drive interrupt output through open collector 71 and provides the signal to the system's interrupt controller as IRQ 15, which is recognized as a secondary hard disk drive interrupt. This portion of circuitry is also equipped with a pull up resistor 73 so that no spurious signals are present on IRQ 15 when an IDE card is not present in connector 50. Finally, it is convenient to use the RSVD2 signal through output pin 20 to provide the HDACTIVE signal when the IDE card is active. This signal is propagated through open collector 75 to provide the HDACTIVE signal to the computer system's hard disk drive active indicating LED. The open collector 75 may alternatively be implemented as a tri-statable gate controlled by the TCK signal (shown by a dashed connection).

From the above, it can be seen that when a regularly compliant PCI card is added to the PCI connector 50, the PCI connections remain as defined by the PCI specification without modification. It is only when an IDE add-in card is utilized in the PCI connector 50 that the operation of the present invention occurs. In alternative embodiments, other unutilized pins may be substituted for those described above. Further, different resistor values may be utilized for the pull up resistors than those indicated. Of course, low and high signals may be swapped to support alternative implementations.

There has thus been described a mechanism for utilizing an IDE add-in card in a PCI compliant expansion slot in a computer system equipped with a PCI bus. Although the present invention has been described in terms of various embodiments, it will be appreciated by those skilled in the art that various modifications and alterations might be made without departing from the spirit and scope of the present invention. The invention should, therefore, be measured in terms of the claims which follow.

What is claimed is:

1. A computer system comprising:
   a central processing unit (CPU);
   a host bus compliant with a first bus standard and coupled to the CPU for conveying signals to and from the CPU;
   an I/O bus compliant with a Peripheral Component Interface (PCI) bus standard and having standard PCI slots for providing a communications path between the computer system and PCI compatible devices;
   a bus bridge coupled between the host bus and the I/O bus for routing transactions between said host bus and the I/O bus;
   a PCI bus connector coupled to the I/O bus for connecting one of the peripheral devices to the standard PCI slots of the I/O bus; and
   circuitry coupled to the PCI bus connector for allowing use of a peripheral device in said bus connector when the peripheral device requires signaling capabilities not provided for by the PCI bus standard, the circuitry receiving signals from the PCI bus connector via one or more pins that are included in and not defined by the PCI bus standard.

2. The computer system of claim 1 wherein the peripheral device is a hard disk drive utilizing an Integrated Drive Electronics (IDE) interface.

3. The computer system of claim 2 wherein the PCI bus connector comprises a plurality of pin-outs, the computer system further comprising:
   a presence signal line coupled to a first bus connector pin-out wherein the first bus connector pin-out is a pin-out not used during normal computer system operation according to the PCI bus standard;
   an IDE interrupt signal line coupled to a second bus connector pin-out wherein the second bus connector pin-out is a pin-out not used during normal computer system operation according to the PCI bus standard; and
   a first control gate coupled to the IDE interrupt signal line and responsive to the presence signal line for steering an IDE interrupt signal on said IDE interrupt signal line as the system's primary hard disk drive interrupt.

4. The computer system of claim 3 further comprising:
   a floppy disk drive controller for providing a DSKCHG output signal;
   a DSKCHG signal receiving line coupled to a third bus connector pin-out wherein the third bus connector pin-out is a pin-out not used during normal computer system operation according to the PCI bus standard; and
   a second control gate coupled between the DSKCHG output signal and the DSKCHG signal receiving line, the second control gate for steering the DSKCHG signal to the third bus connector pin-out responsive to the presence signal line.

5. The computer system of claim 4 further comprising:
   a hard disk drive active indicating light; and
   a hard drive active signal line coupled to a fourth bus connector pin-out and to said hard disk drive active indicating light for providing a signal to activate the hard disk drive active indicating light when the hard disk drive is active, the fourth bus connector pin-out being a pin-out not used during normal computer system operation according to the PCI bus standard.

6. The computer system of claim 4 further comprising a third control gate responsive to the presence signal line for preventing a hard disk drive interrupt from being supplied to the computer system as a primary hard disk drive interrupt when the source of the hard disk drive interrupt is not from the PCI bus connector coupled to the primary I/O bus.

7. The computer system of claim 6 further comprising a fourth control gate responsive the presence signal line for steering hard disk drive interrupt signals not from the PCI bus connector coupled to the primary I/O bus as the computer system's secondary hard disk drive interrupt.

8. The computer system of claim 7 further comprising:
   a first open collector coupled to the output of the third control gate; and
   a second open collector coupled to the output of the fourth control gate,
   wherein the first and second open collectors allow for the sharing of the computer system's primary and secondary hard disk drive interrupts.

9. The computer system of claim 8 further comprising:
   a first pull-up resistor coupled to the presence signal line;
   a second pull-up resistor coupled to the hard disk drive active signal line; and
   a third pull-up resistor coupled to the IDE interrupt signal line.

10. The computer system of claim 9 further comprising a fourth pull-up resistor coupled to the output of said fourth control gate.

11. The computer system of claim 2 wherein the bus connector is fully compliant to receive PCI-compliant add-in cards.

12. The computer system of claim 3 wherein the first bus connector pin-out comprises the pin designated as the TCK input according to the PCI bus standard.

13. The computer system of claim 5 wherein the second, third and fourth bus connector pin-outs comprise reserved pins according to the PCI bus standard.

14. A method of utilizing a hard disk drive having an Integrated Drive Electronics (IDE) interface in a Peripheral Component Interface (PCI)-compliant expansion slot comprising the steps of:

inserting an IDE add-in card into the PCI-compliant expansion slot;

signaling the presence of an IDE add-in card in the PCI-compliant expansion slot by providing an active signal on a first pin included in and not used by PCI-compliant devices;

steering IDE interrupts from a second output of the IDE add-in card via a second pin included in and not used by the PCI-compliant devices to a hard disk drive interrupt of the computer system;

signaling an active signal from a third pin included in and not used by the PCI-compliant devices to a disk drive active light of the computer system when the IDE add-in card is active; and steering a floppy drive controller DSKCHG signal to the PCI-compliant expansion slot via a fourth pin included in and not used by the PCI-compliant device.

15. The method of claim 14 further comprising the step of steering a hard disk drive interrupt from a non-PCI slot to a secondary hard disk drive interrupt in said computer system.

16. The method of claim 15 further comprising the step of lightly pulling up the first, second and third outputs of the PCI slot.

17. The method of claim 14 wherein the first output is coupled to a connector pin designated as a TCK input according to the PCI bus standard.

* * * * *